June 18, 1974   E. P. AUSTIN   3,817,865
ELECTROLYTIC FLOTATION
Filed Nov. 27, 1972                          2 Sheets-Sheet 1

United States Patent Office 3,817,865
Patented June 18, 1974

3,817,865
ELECTROLYTIC FLOTATION
Eric Paul Austin, Sandbach, England, assignor to Simon-Hartley Limited, Stoke-on-Trent, Staffordshire, England
Filed Nov. 27, 1972, Ser. No. 309,818
Claims priority, application Great Britain, Dec. 10, 1971, 57,402/71
Int. Cl. C02b 1/10; C02c 1/26
U.S. Cl. 210—192                    14 Claims

ABSTRACT OF THE DISCLOSURE

Flotation apparatus wherein a liquid to be treated, such as activated sludge for example, is caused to flow through a tank equipped with at least one electrode assembly in the base thereof for the generation of gas bubbles by electrolytic action, whereby suspended materials, usually but not necessarily solids, in the liquid are carried to the surface of the tank by said bubbles to form a layer of thickened material, and there being means for removing the thickened material from the surface of the liquid content within the tank, means being provided for introducing the liquid to be treated substantially evenly either along or adjacent to one entire edge of the or each electrode assembly for flow across same.

---

This invention concerns flotation apparatus of the kind (hereinafter termed of the kind referred to) wherein a liquid to be treated, such as activated sludge for example, is caused to flow through a tank equipped with at least one electrode assembly in the base thereof for the generation of gas bubbles by electrolytic action, whereby suspended materials, usually but not necessarily solids, in the liquid are carried to the surface of the tank by said bubbles to form a layer of thickened material, and there being means for removing the thickened material from the surface of the liquid content within the tank.

According to the present invention, apparatus of the kind referred to is characterised in that means is provided for introducing the liquid to be treated substanti Preferably the dimension across the or each electrode assembly from the edge thereof which receives the liquid to be treated lies in the range of from 0.5–1.5 metres.

The invention will be further apparent from the following description with reference to the several figures of the accompanying drawings, which show by way of example only, a number of forms of apparatus embodying the invention.

Figure 1:
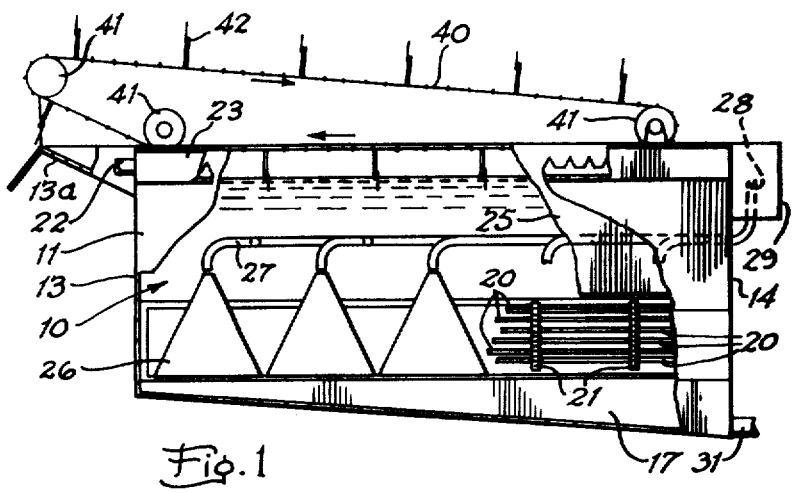
Figure 2:
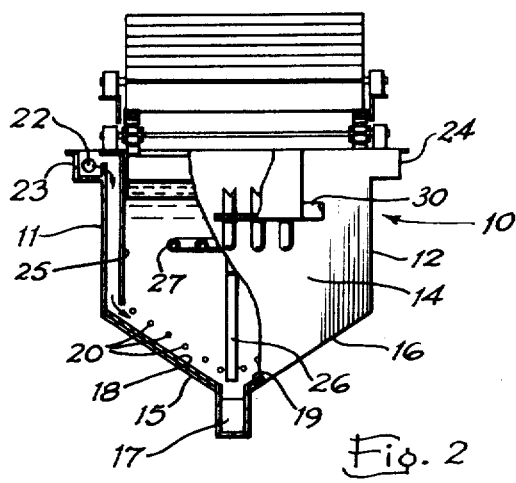
Figures 3, 4:
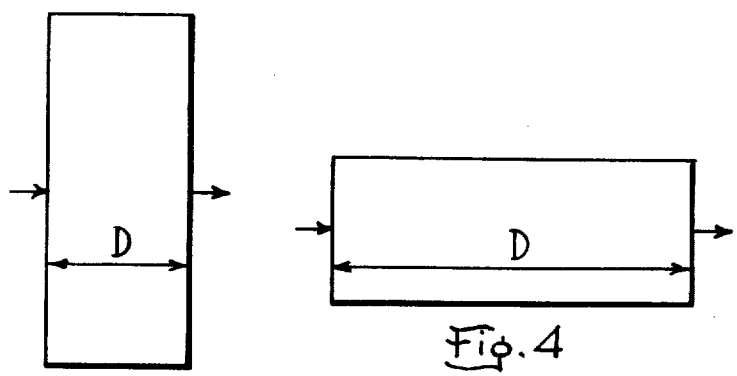

Of the drawings:
FIG. 1 shows a partially sectioned side elevation of one form of the apparatus;
FIG. 2 shows a partially sectioned end elevation of the apparatus of FIG. 1; and
FIGS. 3–8 inclusive show schematic plan views of six alternative forms of apparatus.

Referring now to the drawings, and more especially FIGS. 1 and 2 thereof, it will be seen that the first form of apparatus essentially comprises a tank generally indicated at 10 and comprised by oppositely disposed parallel side walls 11 and 12, end walls 13 and 14 and base plates 15 and 16. The base plates 15 and 16 slope inwardly and downwardly from the lower edges of the side walls 11 and 12, respectively, whereby the depth of the tank 10 increases gradually across its width from both of its sides to a maximum at the centre of the tank. The inner lower edges of the base plates 15 and 16 define the upper ends of a channel 17, running longitudinally of the tank 10 and connecting with the interior thereof and whose depth increases gradually from one end of the tank to the other.

Within the tank 10 are two cathodes 18 and 19 disposed over the base plates 15 and 16 respectively in parallel relationship therewith. Spaced above each of the cathodes 18 and 19 are a plurality of longitudinally extending spaced parallel bars 20 forming anodes. The anode bars 20 are supported in position to form grids whose planes are parallel with the cathodes 18 and 19 respectively, by means of insulating support members 21, mounted on the upper surfaces of the cathodes 18 and 19.

The width of each of the electrode assemblies defined by the width of each grid constituted by the spaced anode bars lies in the range of from 0.5 to 1.5 metres.

The liquid to be treated is supplied via feed pipes 22 into open topped channels 23 and 24 running along the length of the tank 10 at the upper ends of the side walls 11 and 12 respectively.

The liquid flows into the body of the tank from the channels 23 and 24 over the upper edges of the side walls 11 and 12 which define weirs for this purpose. The upper edges of the side walls 11 and 12 are, as best seen in FIG. 1, provided with a serrated profile to ensure that the liquid is substantially evenly distributed over the length of the tank 10 on either side thereof.

Inwardly spaced from the side walls 11 and 12 are parallel depending baffle plates 25 extending longitudinally over the length of the tank, whose lower ends are disposed adjacent the upper ends of the grids defined by the anodes 20, whereby the inflowing liquid is introduced into the body of the tank 10 for downward flow through the spaces in the electrode assemblies between the cathodes and anode grids thereof.

A plurality of nozzles 26 of fishtail form are provided and disposed in side-by-side relationship with their orifices directed downwardly along the length of the tank 10 above the channel 17 and located at a position between the inner lower edges of the two cathodes 18 and 19 and lowermost anode bars 20 of the two anode grids, at a level coinciding with the spaces in the electrode assemblies between the cathodes and anode grids thereof.

Each nozzle 26 connects with a pipe 27 which extends out of the body of the tank 10 to terminate in an upright portion 28 disposed within an overflow box 29. The upper ends of the portions 28 are positioned at a level slightly below the desired level of liquid in the tank 10.

Means to remove thickened material from the surface of the liquid contained within the tank 10 is provided and comprises endless chains 40 supported on sprocket wheels 41 at opposite sides of the tank 10, there being a plurality of spaced transversely extending scraper blades 42 between the two chains 40 on the opposite sides of the tank.

The chains are adapted to be driven in the direction of the arrows so that the scraper blades 42, whose lower edger edges dip into the surface of the contents of the tank, are drawn longitudinally of the tank to gather thickened material and move it towards an inclined upper terminal portion 13 of the end wall 13. The sprocket wheels 41 are so disposed that adjacent the end of the tank 10, defined by the wall 13, the blades 42 travel in an inclined direction to draw the collected thickened material over the portion 13a to drop from the end thereof into suitable collecting means (not shown).

In use, liquid to be treated, such as activated sludge for example, is continuously fed to the tank 10 and introduced substantially evenly along the length of the two electrode assemblies for downward flow through the spaces between the cathodes and anode grids thereof. An electrical potential difference is established between the cathodes and anodes whereby gas bubbles are generated by electrolytic action. Suspended materials within the liquid to be treated tend to flocculate under the influence of the electric field and gas bubbles attach to the flocs to carry them to the surface to form the thickened sludge material which is harvested in the manner described above.

The treated liquid is gathered into the nozzles 26 as it emerges from the electrode assemblies and flows into the box 29 under the action of hydrostatic pressure and is conveyed away through a pipe 30 connecting with the box 29.

Any sediment which tends to collect in the base of the tank is displaced by the washing action of the incoming liquid and gravity into the channel 17 which can be cleared continuously or at periodic intervals by means of the outlet 31.

It will be appreciated that it is not intended to limit the invention to the above example only, many variations such as might readily occur to one skilled in the art, being possible without departing from the scope thereof, as defined by the appended claims.

Figures 5, 6:
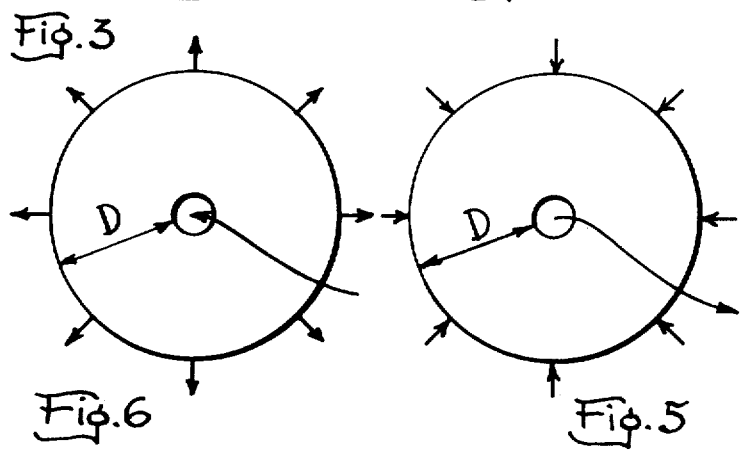
Figures 7, 8:
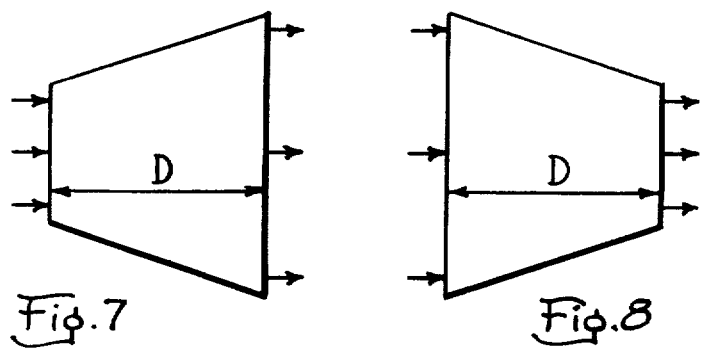

Thus, for example, two electrode assemblies need not be provided in a common tank, and a single electrode assembly may be provided in the tank which may be one of a variety of shapes. A number of possible shapes are shown in FIGS. 3 to 8 inclusive in which the flow of liquids to be treated through the tanks is indicated by arrows. The arrangements of FIGS. 5 and 6 deserve special mention where the tanks are of circular shape having a central zone serving for the collection of treated liquid on the one hand and supply of liquid to be treated on the other hand. In all these arrangements it is preferred that the bases of the tanks slope downwardly in the direction of liquid flow and it follows that the bases of the tanks in the arrangements of FIGS. 5 and 6 are in the form of an inverted and right conical shell respectively. In each of these arrangements the dimension D across the electrode assemblies from the edges thereof which receive the liquid to be treated is arranged preferably to lie in the range of from 0.5–1.5 metres.

Whilst it is preferred to arrange for the liquid to be treated to flow downwardly over the or each electrode assembly, it would be possible for such to flow upwardly over the or each electrode assembly which would then be inclined upwardly from the position at which the liquid to be treated was fed thereto.

It will be understood that by the term electrode assembly as used throughout the specification and claims we mean that assembly of electrical current carrying members across which the liquid or a portion of the liquid to be treated flows during its passage through the tank. Thus the or each electrode assembly may be comprised by one or more units each having at least one cathode and one anode.

What is claimed is:

1. Electrolytic flotation apparatus comprising a tank with at least one electrode assembly located within said tank and means for introducing liquid to be treated substantially evenly along one entire edge of said electrode assembly for flow across the same, the dimension across said electrode assembly from the edge thereof which receives the liquid to be treated lying in the range of from 0.5–1.5 metres.

2. Apparatus according to claim 1 wherein said electrode assembly is comprised by a first electrode in the form of a grid positioned in spaced relationship above a second electrode.

3. Apparatus according to claim 2 wherein said first and second electrodes are the anode and cathode respectively.

4. Apparatus according to claim 2 wherein said means for introducing the liquid to be treated is disposed for introducing said liquid into the electrode assembly through the space between said first and said second electrodes.

5. Apparatus according to claim 2 wherein means is provided for collecting the treated liquid from the space between said first and second electrodes.

6. Apparatus according to claim 5 wherein said means for collecting the treated liquid comprises slot defining means and conduit means communicating with said slot defining means and terminating at a level slightly below the required level of liquid in the tank, the liquid entering said slot defining means and overflowing the upper end of the conduit means into a collecting reservoir through the action of hydrostatic pressure.

7. Apparatus according to claim 1 wherein said means for introducing the liquid to be treated comprises a weir extending along and above said entire edge of the electrode assembly.

8. Apparatus according to claim 7 wherein said weir has a serrated profile.

9. Apparatus according to claim 7 wherein a baffle plate is provided adjacent the weir to guide the liquid downwardly into the tank from said weir to the level of its associated electrode assembly.

10. Apparatus according to claim 1 wherein the plane of said electrode assembly is inclined to the horizontal.

11. Apparatus according to claim 10 wherein said electrode assembly slopes downwardly in the direction of flow of liquid to be treated.

12. Apparatus according to claim 10 wherein the base of the tank beneath said electrode assembly is parallel therewith.

13. Apparatus according to claim 1 wherein the tank is provided with a well portion beneath the level of said electrode assembly for the collection of any sediment from the contents of the tank.

14. Apparatus according to claim 1 wherein the tank is rectangular, having two electrode assemblies each sloping downwardly from opposed longitudinal side walls of the tank towards a central portion of the tank of maximum depth, and liquid to be treated being introduced into the tank for flow across the opposed electrode assemblies from both of the opposed longitudinal sides of the tank towards the centre thereof.

References Cited
UNITED STATES PATENTS

| | | | |
|---|---|---|---|
| 3,035,992 | 5/1962 | Hougen | 204—149 |
| 3,347,786 | 10/1967 | Baer et al. | 204—149 X |
| 3,479,281 | 11/1969 | Kikindai et al. | 210—44 |
| 3,505,188 | 4/1970 | Pei-Tai Pan | 204—149 |
| 3,523,891 | 8/1970 | Mehl | 210—44 |
| 3,543,936 | 12/1970 | Abson et al. | 204—149 X |
| 3,684,703 | 8/1972 | Marmo | 204—149 X |

HOWARD S. WILLIAMS, Primary Examiner

A. C. PRESCOTT, Assistant Examiner

U.S. Cl. X.R.

204—149; 210—44, 47